(12) United States Patent
Lin et al.

(10) Patent No.: US 6,822,019 B2
(45) Date of Patent: Nov. 23, 2004

(54) COMPLEX OF CLAY AND POLYOXYALKYLENE AMINE GRAFTED POLYPROPYLENE AND METHOD FOR PRODUCING THE SAME

(75) Inventors: Jiang-Jen Lin, Taichung (TW); Yi-Chien Chen, Chang Hua (TW)

(73) Assignee: National Chung-Hsing University, Taichung (TW)

( * ) Notice: Subject to any disclaimer, the term of this patent is extended or adjusted under 35 U.S.C. 154(b) by 464 days.

(21) Appl. No.: 10/029,727

(22) Filed: Dec. 21, 2001

(65) Prior Publication Data

US 2003/0149155 A1 Aug. 7, 2003

(51) Int. Cl.[7] .......................... C04B 33/04; C08K 3/34; C08K 9/04; B32B 19/00
(52) U.S. Cl. ................. 523/216; 523/201; 524/445; 524/504; 521/148; 427/221; 428/454
(58) Field of Search ................. 523/216, 201; 524/445, 504; 501/148; 427/221; 428/454

(56) References Cited

U.S. PATENT DOCUMENTS 3,326,804 A * 6/1967 Hu .............................. 508/316
5,747,596 A * 5/1998 Emert et al. ................. 525/298
6,414,069 B1 * 7/2002 Pinnavaia et al. ........... 524/445

* cited by examiner

Primary Examiner—Tae H. Yoon
(74) Attorney, Agent, or Firm—Charles E. Baxley

(57) ABSTRACT

The present invention discloses a complex of clay and polyoxyalkylene amine grafted polypropylene and a method for producing the same. The clay in the present invention is formed by modifying inorganic layered silicate clay with an amphibious intercalating agent obtained by polymerizing polyoxyalkylene amine having molecular weight over 1,800 and polypropylene-grafting-maleic anhydride (PP-g-MA). The method for producing the complex is primarily to polymerize the polyoxyalkylene diamine having molecular weight over 1,800 and polypropylene-grafting-maleic anhydride (PP-g-MA) to form an amphibious intercalating agent, which is then acidified with an inorganic acid, and mixed with the swelled clay by powerfully stirring at 60–80° C. for cation exchanging to obtain the titled complex. According to the present invention, the complex is an excellent surfactant and a reinforcing agent of polymers.

11 Claims, 2 Drawing Sheets

COMPLEX OF CLAY AND POLYOXYALKYLENE AMINE GRAFTED POLYPROPYLENE AND METHOD FOR PRODUCING THE SAME

BACKGROUND OF THE INVENTION

1. Field of the Invention

The present invention relates to complexes of clay and polyoxyalkylene amine grafted polypropylene copolymers and a method for producing the same, the complexes in which can be particularly applied to oily surfactants and reinforcing agents of polymers.

2. Description of the Related Technology

Currently, inorganic/organic polymer composite materials under a nanoscale regime are one of the most significant materials, and thus have been widely investigated and developed. Such composite materials are dual-phased wherein at least one phase is dispersed under a nanoscale regime. Accordingly, compatibility between the two phases, for example, clay and polymers, is always essential for the nanoscale dispersion.

For layered silicate clay which is hydrophilic and immiscible with most organic solvents, the interspace is looser when intercalating with organic quaternary ammonium, and thus monomers are allowed to enter therethrough. The monomers can be polymerized to obtain an exfoliated inorganic/organic polymer composite material. In principle, the distances, enlarged by intercalating agents, are constant and required to be wide enough for monomer or polymer molecules to enter. As for exfoliation, the interlayer distances are irregular and different directions may occur in each silicate platelet. Therefore, the stack of layered silicates is no longer in an ordered form but dispersed in organic polymers with in individual platelet. The exposed surfaces are tremendously increased and the silicates/organic polymers interaction order magnitude enhanced.

Conventional intercalating agents such as 12-aminolauric acid, hexadecylamine, fatty alkyl amine, bis(2-hydroxyethyl) methyl tallow alkyl ammonium chloride and stearylamine, usually commercially available surfactants having low molecular weights, and interlayer distances of the clay can be expanded to a certain degree.

Referring to the research of T. J. Pinnavaia (Michigan State University), intercalating agent $CH_3(CH_2)_n-NH_3^+$ is provided to mixed with montmorillonite (MMT), which is then dispersed in diglycidyl ether of BPA (epoxy resin Epon828) to form a polyether-clay composite material under a nanoscale regime. For such intercalating agent, the interlayer distances can be enlarged to 18.0 Å. The epoxy resin can then form an epoxy/clay material through self polymerization at 75° C. This reference also indicates an improvement in heat distortion temperature. The intercalating agent performs a rule of monolayer to bilayer, and even to pseudo-trilayer. The interlayer distance ranges between 13.8–18.0 Å, which allow the epoxy resin to enter and polymerize therein, and further to exfoliate the layered inorganic matter so that application effect including mechanical property of inorganic/organic nanomaterials can be achieved.

Japanese Patent No. 8-22946 discloses the first commercial inorganic/organic polymer composite material under a nanoscale regime, which is developed by Toyota Company. This composite material is produced by dispersing $[H_3N^+(CH_2)_{11}COO^-]$-montmorillonite in Nylon 6 polyamide, wherein the aminocarboxylic acid is provided as an intercalating agent and the polymers are formed between layers of the clay through condensation of caprolactam monomers. However, the aminocarboxylic acid doesn't facilitate nonpolar polymers such as polyethylene and polypropylene, to uniformily disperse in the hydrophilic layered silicate. Accordingly, Japanese Patent Publication No. 8-53572 provides organic onium ions as an intercalating agent to mix with layered silicate, which can be uniformly dispersed in molten polyolefin resin. Unfortunately, though the organic onium ions can enlarge the interlayer distances, affinity between the intercalating agent and the polyolefin resin is not enough to exfoliate the layered silicate. Further, Japanese Patent Publication No. 10-182892 indicates that when blending in a molten mixture containing olefin oligomers with H-bond and polyolefin resin, the organized layered silicate might be indefinitely exfoliated due to the strong affinity therebetween. However, it's a dilemma whether to increase the oligomers for better dispersing or to decrease the oligomers for better mechanical characteristics. Hence, the main problem to be overcome is the lacking of compatibility between hydrophilic inorganic silicates and hydrophobic or nonpopular organic polymers.

Accordingly, there is a need to ameliorate the composites by means of providing appropriate intercalating agents which can act as compatibilizers, so that the silicates can be modified and complexed to become as novel inorganic/organic surfactants. The complexes can be used as such to be surfactants which have wide and important industrial applications. Furthermore, the intercalated complexes can be further used to compound with other nonpolar organic polymers such as polypropylene, polyethylene, polybutylene, etc. as the conventional nanomaterials are required.

SUMMARY OF THE INVENTION

The object of the present invention is to provide a complex of clay and specific intercalating agents and a method for producing the same, so that the complex is stable enough and has excellent affinity for polymers and organic matters. The specific intercalating agents are polyoxyalkylene amine grafted polypropylene which is possessing both ionic amine intercalating ability and polypropylene backbone hydrophobicity.

In order to achieve the above object, the more specific complex of the present invention is primarily formed by modifying inorganic layered silicate clay with an amphibious intercalating agent obtained by polymerizing polyoxyalkylene amine having molecular weight over 1,800 and polypropylene-grafting-maleic anhydride (PP-g-MA). The polyoxyalkylene amine grafted PP-g-MA is the product from the reaction of amines and maleic anhydride to form amidoacid or imide linkaged graft copolymer.

The polyoxyalkylene amine aforementioned can be polyoxyalkylene diamine, and preferably polyoxypropylene diamine, polyoxyethylene diamine, poly(oxyethylene-oxypropylene) diamine and polyoxypropylene triamine.

The layered silicate clay used in the present invention is not restricted, and preferably montmorillonite, kaolin, mica or talc. In general, the clay with CEC (cation exchange capacity) ranging between 50–200 meq/100 g is preferred. Beyond such a range, the clay is difficult to be swelled because of insufficient ion exchange or excessive attraction between layers.

The method for producing the complexes of the present invention is primarily to polymerize the polyoxyalkylene amine having molecular weight over 1,800 and polypropylene-grafting-maleic anhydride (PP-g-MA) to form an amphibious intercalating agent. The intercalating agent is then acidified with an inorganic acid, and then mixed with the swelled clay by powerfully stirring at 60–80° C. for cation exchanging to obtain the complex.

The inorganic acid aforementioned is not restricted, and preferably hydrochloric acid, sulfuric acid, phosphoric acid or nitric acid.

According to the present invention, the complexes of clay and PP-g-MA grafted polyoxyalkylene amine are hydrophobic, rather than hydrophilic as before the intercalation, and compatible with polymers. The complexes can be applied as oily surfactants and be used to improve characteristics of polymers.

DETAILED DESCRIPTION OF THE INVENTION

Since hydrophobic polypropylene is not compatible with highly polar Na-cation-exchanging montmorillonite ($Na^+$-MMT), polypropylene-grafting-maleic anhydride (PP-g-MA) is provided in the present invention to polymerize with polyoxyalkylene diamine and thus form comb-like amphibious polymers. This comb-like structure includes a backbone of nonpolar polypropylene, and side chains having multiple polar functional pending groups of polyoxyalkylene ending with an amino group. The polyoxyalkylene backbone can be polyoxyethylene (POE), polyoxypropylene (POP) or the like. The maleic anhydride has high cyclic tension and easily reacts with nucleophilic molecule, so that primary aliphatic amine can react with maleic anhydride at 70° C. to open the circle ring and form a structure having functional groups of carboxylic acid (COOH) and amide. The aforementioned reaction of polyoxyalkylene amine and PP-g-MA can be illustrated as the following scheme.

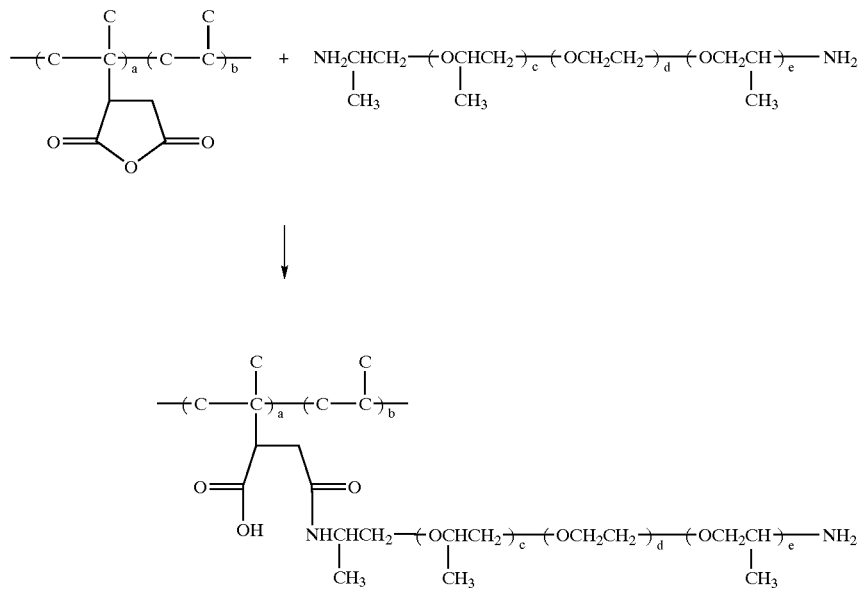

Figure 1:
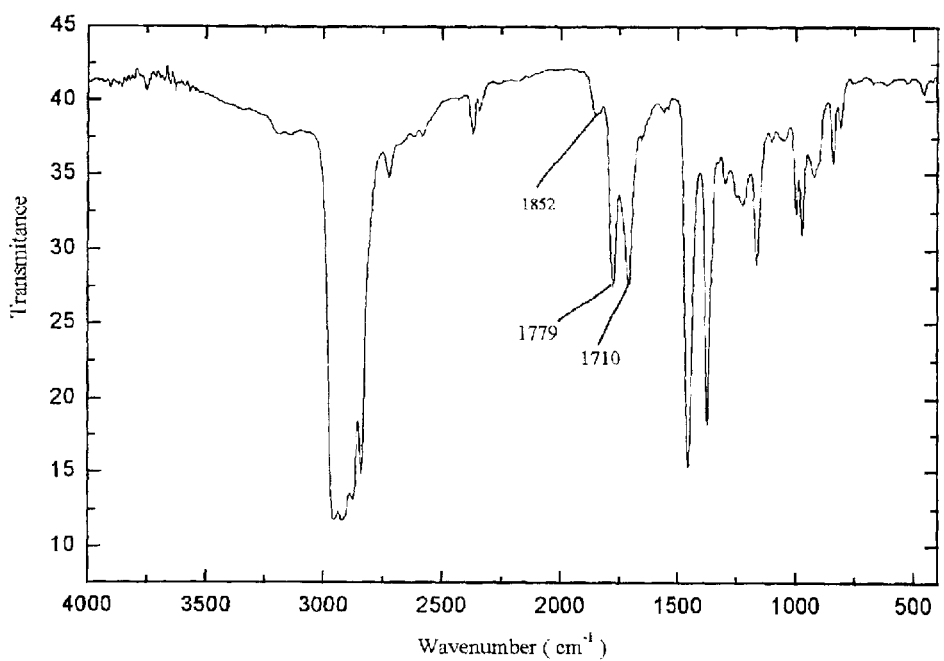
FIG. 1 shows the FTIR spectrogram of PP-g-MA.

FIG. 1 shows the FTIR spectrogram of PP-g-MA, wherein 2800–3000 cm$^{-1}$, 1500 cm$^{-1}$ and 1430 cm$^{-1}$ indicate absorption peaks of CH$_3$, CH$_2$, and CH$_3$, respectively; and particularly 1852 cm$^{-1}$ and 1779 cm$^{-1}$ indicate absorption peaks of symmetric C=O and asymmetric C=O on the cyclic ring of the maleic anhydride.

Figure 2:
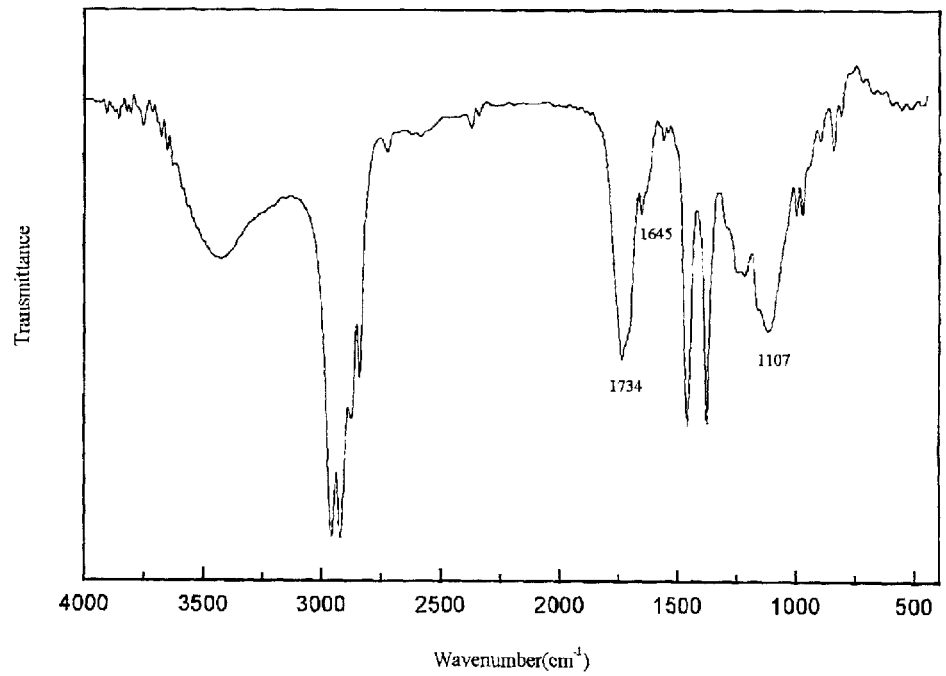
FIG. 2 shows the FTIR spectrogram of the amphibious intercalating agent formed by PP-g-MA and ED-2001.

FIG. 2 shows the FTIR spectrogram of the amphibious intercalating agent formed by PP-g-MA and ED-2001, wherein the peaks at 1852 cm$^{-1}$ and 1779 cm$^{-1}$ disappear, and the peaks of amide, polypropylene chain and amine respectively at 1645 cm$^{-1}$, 1107 cm$^{-1}$ and 3320 cm$^{-1}$ are generated. According to such spectrograms, completion of the reaction had been confirmed.

The end amino groups of the side chains of the comb-like polymers can be acidified to form positive-charged quaternary ammonium and then perform cation exchanging with clay, whereby the polymers can be easily induced thereinto. The following scheme illustrates such procedure.

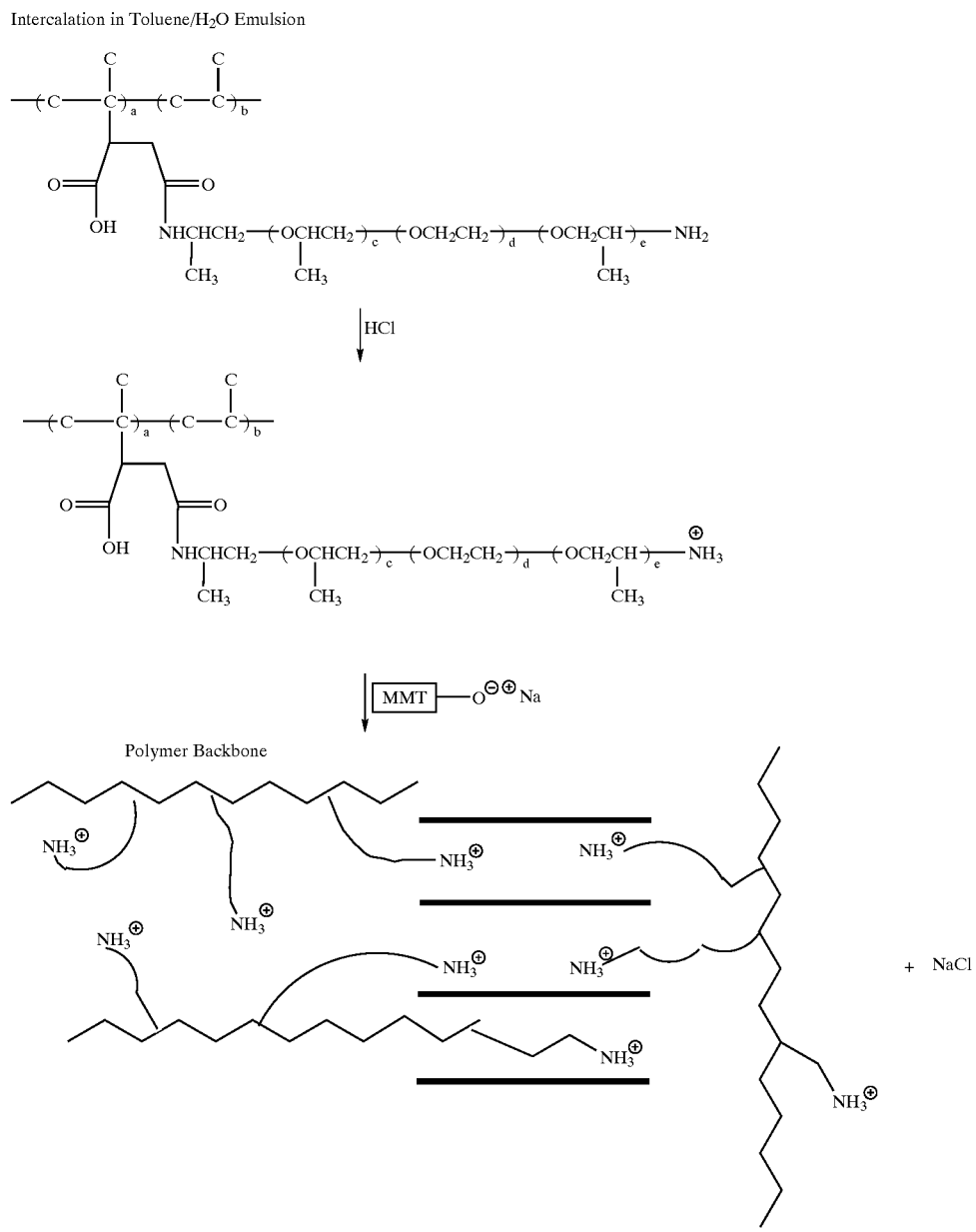

In order to explicitly explain the present invention, some preferred examples are described in detail as the follows. However, it should be noticed that the scope of the present invention can't be limited to these examples.

In the examples of the present invention, the modified commercial montmorillonite including aliphatic ammonium intercalating clay (Cloisite 20A) and Na-cation-exchanging montmorillonite (Kunipia F) are used. In general, montmorillonite is alumino-silicate clay, and has a structural formula including two layers of tetrahedral silicate and one layer of octahedral alumina therebetween. Montmorillonite has a primary structure or structural unit of average 8–10 parallel layers, about 8–10 nm (i.e., 80–100 Å) in height wherein each layer is 9.6–10 Å thick, and 12 Å distance between layers by X-ray analysis which includes the thickness of alunino-silicates. A secondary structure of the montmorillonite is about size 0.1–10 μ in diameter and can be formed by aggregating hydrophilic silicate thereof.

The PP-g-MA used in the examples is produced by Eastman Co. (Epolene E-43 or MPP-9100), which has weight average Mw=9100 detected with gel permeation chromatography, numerous average Mn=3900, and titration acid value=47 mg KOH/g. The maleic anhydride contained in the PP-g-MA is 4 wt. %, or 3.7 maleic anhydride for each PP-g-MA.

The polyoxyalkylene amine used in the examples is commercial product of Huntsman Chemical Co., which includes Jeffamine series, for example, Jeffamine D-2000 (poly(propylene glycol) bis (2-aminopropyl ether)) and Jeffamine D-4000 (poly(propylene glycol) bis (2-aminopropyl ether)) having structure as the following scheme;

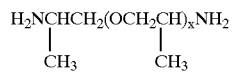

X=33 (Approx. m.w.=2000; Jeffamine® D-2000)
X=68 (Approx. m.w.=4000; Jeffamine® D-4000)
and Jeffamine ED-2001 (poly(propylene glycol)-block-poly (ethylene glycol)-block-poly(propylene glycol) bis(2-aminopropyl ether)) having structure as the following scheme.

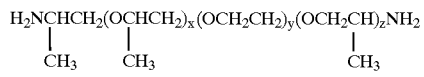

Average=$x+z$=5, $y$=39.5 (Approx. m.w.=2000; Jeffamine® ED-2001)

Additionally, T-3000 (tri-functional poly(propylene glycol) 2-aminopropyl ether), T-5000 (tri-functional poly (propylene glycol) 2-aminopropyl ether), etc., can be applied, too.

Example 1

The complex of the present invention are produced according to steps of:

Step 1: Swelling the layered inorganic silicate clay

Montmorillonite Kunipia F (5 g, CEC=115 meq/100 g) is dispersed in water (1,000 ml, 80° C.), and then powerfully stirred for 4 hours to form an earth-colored stable uniform slurry in water.

Step 2: Synthesizing the amphibious intercalating agent

PP-g-MA (37 g, containing 15 mmole maleic anhydride) is added into toluene and heated to 120° C.; ED-2001 (30 g, 15 mmole) is mixed with the toluene solution to form gel-like precipitate which is the amphibious intercalating agent PP-g-MA/ED-2001. The compound has been confirmed by FT-IR.

Step 3: Acidifying the amphibious intercalating agent PP-g-MA/ED-2001

The amphibious intercalating agent PP-g-MA/ED-2001 (13.2 g, containing 5.75 meq of end amino group) is dissolved in toluene, and then equivalent moles of hydrochloric acid is added to perform acidification at 80° C. for 30 minutes. The acidified emulsion is an amine salt and appropriate for intercalating.

Step 4: Intercalating the amine salt to the layered inorganic silicate clay

The acidified emulsion of Step 3 is added into the slurry of Step 1, and then powerfully stirred at 80° C. for 6 hours to perform cation exchange or intercalating process. The mixture is then settled and filtered. The filtered solid is then dried in a vacuum oven at 80° C. for 24 hours to obtain dried tint solid complex. The interlayer distance detected with X-ray diffraction, as listed in Table 1, is 19.5 Å.

Example 2

Repeat steps of Example 1 but replace montmorillonite (Kunipia F) with aliphatic ammonium intercalating clay (Cloisite 20A). The interlayer distance detected with X-ray diffraction, as listed in Table 1, is 20.0 Å.

Comparative Examples

Repeat steps of Example 1, but using different clays and intercalating agents as listed in Table 1 are added. The interlayer distances detected with X-ray diffraction are also listed in Table 1.

TABLE 1

| Intercalating agent | Interlayer distance of MMT k10 (Å) | Interlayer distance of Kunipia F (Å) | Interlayer distance of Cloisite 20A (Å) |
|---|---|---|---|
| — | 10.1 | 12.4 | 24.7 |
| PP-g-MA | 10.1 | 12.4 | — |
| ED-2001 | 10.1 | 19.5 | 19.5 |
| PP-g-MA/ED-2001 | 10.5 | 19.5 | 20.0 |
| PP-g-MA/DAP | 10.5 | 14.3 | — |

As shown in Table 1, the natural montmorillonite K10 without $Na^+$ exchanging can't perform cation exchanging with quaternary ammonium, all of various intercalating agents afforded the same interlayer d-spacing around 10 Å. However, the commercial montmorillonite Cloisite 20A can perform the desired intercalation and give an enlarged d-spacing. The intercalation of $Na^+$-MMT (Kunipia F) and the amphibious intercalating agents indicates that the grafted ending amino groups can intercalate into layers of clay silicates and expand the interlayer distances to 12.4–19.5 Å.

Figure 3:
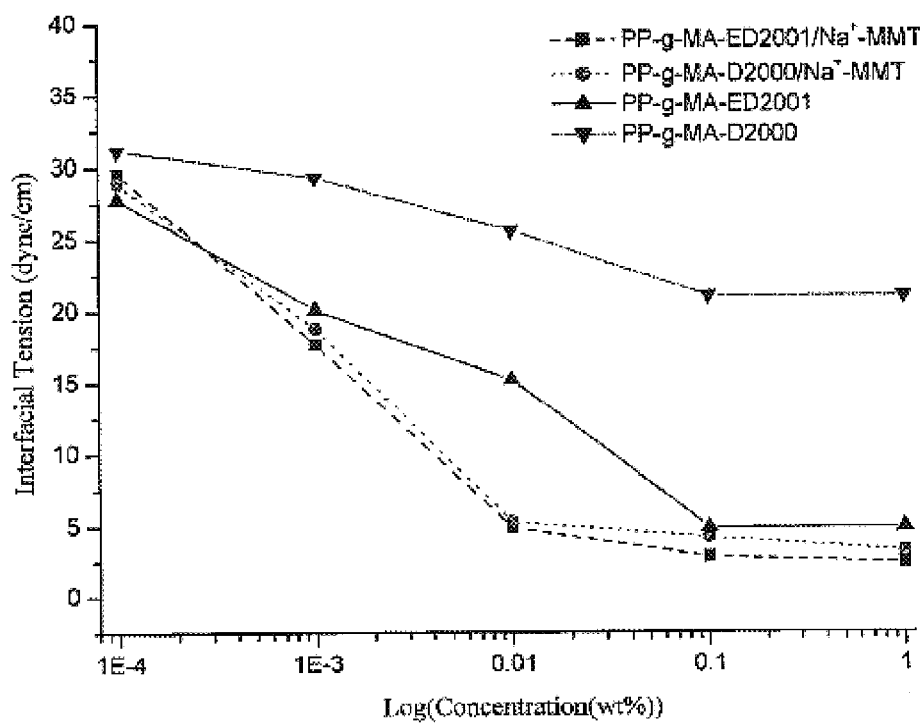
FIG. 3 shows interfacial tensions of toluene/water mixing with the comb-like polymers or the $Na^+$-MMT clay intercalated with the comb-like polymers.

Since the intercalating agents have hydrophobic main chain (backbone) polypropylene and the clay has hydrophilic silicate layers consisting of interlayer hydrated $Na^+$ ions and polyoxyalkylene pendants, the resultant material obtained according to the above method possesses particular amphiphilicity and interfacial properties. FIG. 3 shows interfacial tensions of toluene/water mixing with the comb-like polymers or the $Na^+$-MMT clay intercalated with the comb-like polymers. As shown in FIG. 3, only 10 ppm PP-g-MA/ED-2001/$Na^+$-MMT is desired to lower the interfacial tension of toluene/water from 36.0 dyne/cm to 17.7 dyne/cm. Furthermore, a critical micelle concentration (CMC) 100 ppm can be observed, and the interfacial tension can lower even to 4.9 dyne/cm. However, if both of the main and side chains of PP-g-MA/D-2000 are hydrophobic, the interfacial tensions can't effectively lower the interfacial tension indicating the improper balance of hydrophilic and hydrophobic nature. As for another complex of the present invention, PP-g-MA/ED-2001/$Na^+$-MMT, the interfacial tension can be reduced to 4.2 dyne/cm because of hydrophilic $Na^+$-MMT and ED-2001 structure.

Figure 4:
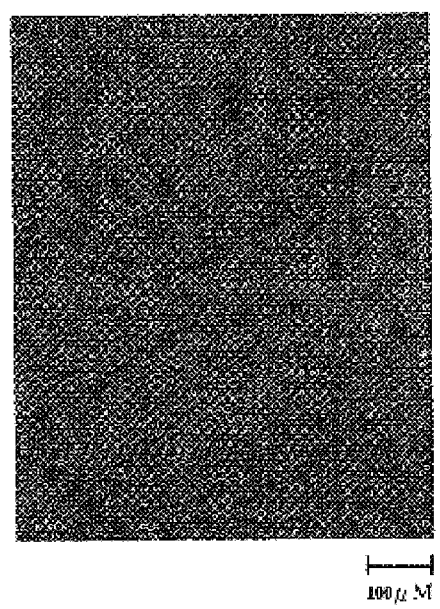
FIG. 4 shows a stable dispersing status when the complex PP-g-MA/ED-2001/clay is mixed with toluene/water.

Additionally, the complexes of the present invention is excellent for emulsification. FIG. 4 shows a stable dispersing status when the complex PP-g-MA/ED-2001/clay (0.1 g) is mixed with toluene/water (8 g/1 g) by ultrasonic vibrations, which is observed under optical microscopy.

Therefore, it can be analogized that polymers such as epoxy resin, polypropylene (PP), polyethylene glycol terephthalate (PET), polystyrene (PS), syndiotactic polystyrene (SPS), polyurethane (PU), Nylon and styrene-acrylnitrile copolymer (SAN), can be easily dispersed in these complexes under a nanoscale regime to form inorganic/organic composite materials. Furthermore, characteristics of polymers such as resistance to heat distortion, gas barrier properties, rigidity, etc., may be improved by mixing with these polymers to form various kinds of nano-composites. Additionally, the polypropylene structure of the intercalating agents facilitates mixing well with polypropylene and thus changes polar characteristics thereof, so that the adhesion of polypropylene to organic dyes, inks and the like can be improved.

What is claimed is:

1. A complex of clay silicate and polyoxyalkylene amine grafted polypropylene, which is formed by modifying inorganic layered silicate clay with an amphibious intercalating agent obtained by polymerizing polyoxyalkylene amine having molecular weight over 1,800 and polypropylene-grafting-maleic anhydride (PP-g-MA).

2. The complex of claim 1, wherein said polyoxyalkylene amine is polyoxyalkylene diamine.

3. The complex of claim 1, wherein said polyoxyalkylene amine is selected from a group consisting of polyoxypropylene diamine, polyoxyethylene diamine and poly(oxyethylene-oxypropylene) diamine.

4. The complex of claim 1, wherein said clay is selected from a group consisting of montmorillonite, kaolin, mica and talc.

5. The complex of claim 1, wherein said clay has a cation exchange capacity between 50–200 meq/100 g.

6. A method for producing a complex of clay and polyoxyalkylene amine, wherein said clay is layered and includes silicate; said method is primarily to polymerize said polyoxyalkylene amine having molecular weight over 1,800 and polypropylene-grafting-maleic anhydride (PP-g-MA) to form an amphibious intercalating agent, which is then acidified with an inorganic acid, and mixed with said swelled clay by powerfully stirring at 60–80° C. for cation exchanging to obtain said complex.

7. The method of claim 6, wherein said clay is selected from a group consisting of montmorillonite, kaolin, mica and talc.

8. The method of claim 6, wherein said clay has a cation exchange capacity between 50–200 meq/100 g.

9. The method of claim 6, wherein said polyoxyalkylene amine is polyoxyalkylene diamine.

10. The method of claim 6, wherein said polyoxyalkylene amine is selected from a group consisting of polyoxypropylene diamine, polyoxyethylene diamine and poly(oxyethylene-oxypropylene) diamine adduct.

11. The method of claim 6, wherein said inorganic acid is selected from a group consisting of hydrochloric acid, sulfuric acid, phosphoric acid and nitric acid.

* * * * *